July 21, 1970    A. J. DE MARIA ET AL    3,521,192
LASER PULSE SHAPING SYSTEM
Filed Aug. 25, 1967
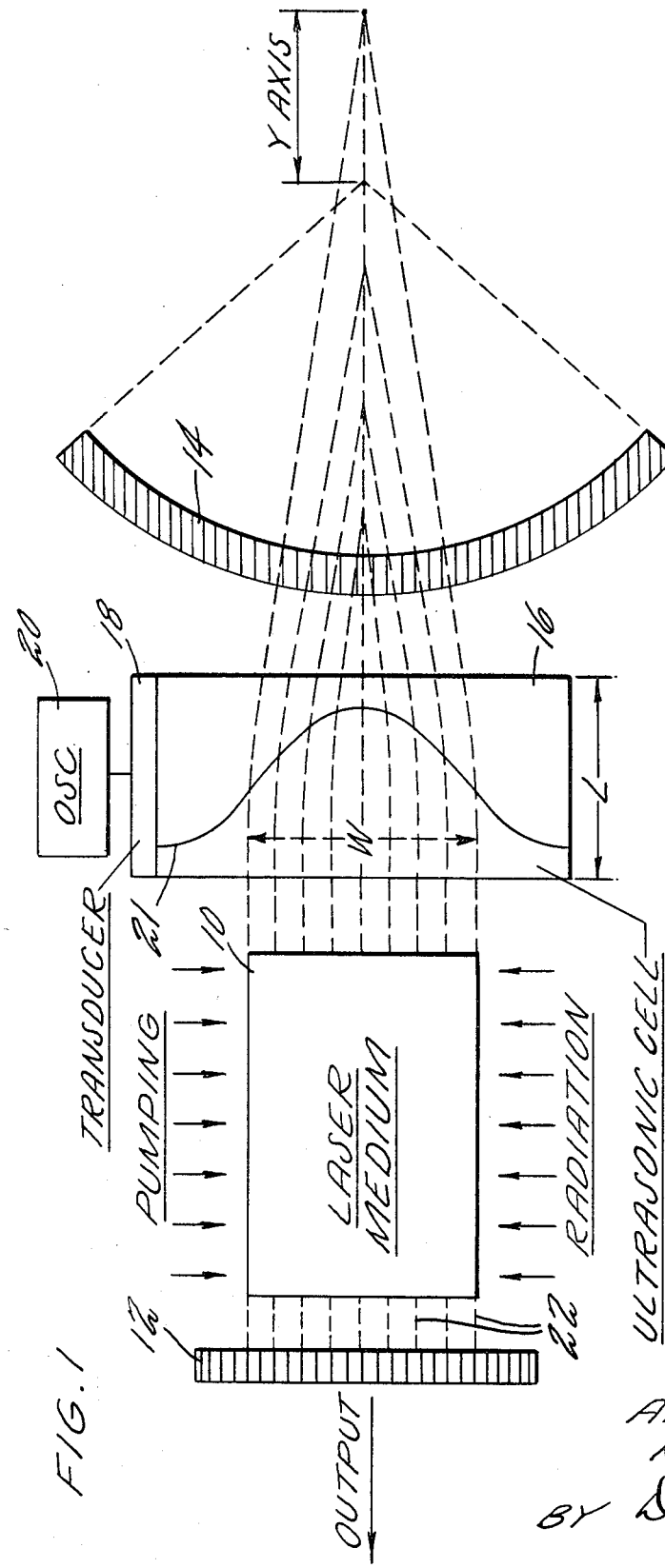
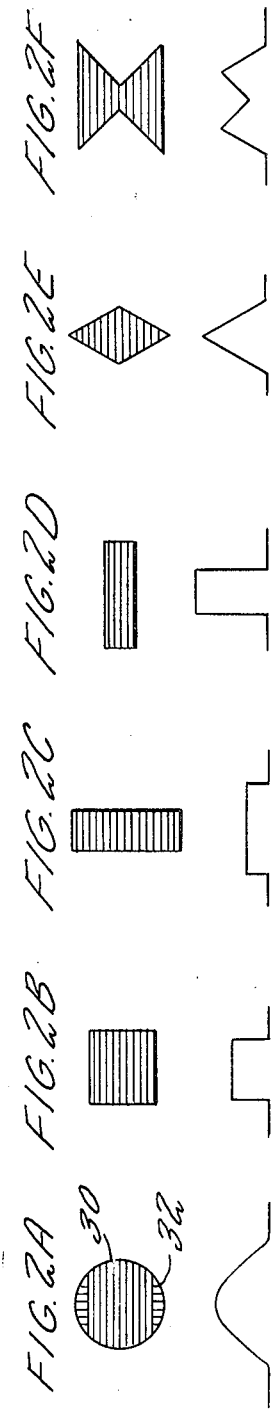
INVENTORS
ANTHONY J. DeMARIA
RONALD M. GAGOSZ
BY Donald F. Bradley
ATTORNEY United States Patent Office 3,521,192
Patented July 21, 1970

3,521,192
LASER PULSE SHAPING SYSTEM
Anthony J. De Maria, West Hartford, and Ronald M. Gagosz, Farmington, Conn., assignors to United Aircraft Corporation, East Hartford, Conn., a corporation of Delaware
Filed Aug. 25, 1967, Ser. No. 663,337
Int. Cl. H01s *3/00;* G02f *1/28*
U.S. Cl. 331—94.5                                         8 Claims

ABSTRACT OF THE DISCLOSURE

An acoustic cell is inserted between a laser medium and a detached external convex reflector, and when an acoustic wave having a wavelength approximately equal to the width of the laser beam is propagated in the cell, feedback to the laser medium is selectively initiated to generate various output laser pulse shapes.

CROSS-REFERENCES TO RELATED APPLICATIONS

The present invention may be used in conjunction with or in preference to the method of laser pulse shaping disclosed in the copending application of the same assignee entitled "Laser Pulse Shaping Using Acoustic Waves," filed May 23, 1966 by Anthony J. De Maria, Ser. No. 552,315, now abandoned. The basic theory of laser-acoustic interaction is disclosed in U.S. Pat. No. 3,297,876. An ultrasonic-acoustic scanning cell which may be used with this invention is disclosed in the copending application of the same assignee entitled "Ultrasonic Scanning Cell," filed Oct. 28, 1964 by Herbert G. Aas and Robert K. Erf, Ser. No. 407,082.

A method for producing focused acoustic pulses which intersect the electromagnetic feedback radiation in the laser cavity is disclosed in the copending application of the same assignee entitled "Laser Modulation Using Focused Acoustic Energy," filed Sept. 14, 1965 by Anthony J. De Maria, Ser. No. 487,181.

BACKGROUND OF THE INVENTION

Field of invention

This invention relates to lasers, and particularly to a method and apparatus for producing various pulse shapes in the output of the laser. More specifically, this invention describes the use of an acoustic wave which interacts with the laser electromagnetic radiation within the laser feedback cavity, in conjunction with a convex or spherical reflector used in place of the usual laser external mirror, to cause positive feedback through the laser medium in selected portions of the laser medium, thereby producing various unique output pulse shapes.

SUMMARY OF THE INVENTION

An object of the present invention is to provide an improved method and apparatus for shaping the output of a laser.

Another object of this invention is to provide an improved method and apparatus for controlling the output of a laser.

A further object of this invention is to provide a laser output pulse having various pulse shapes.

Another object of this invention is to provide a method for investigating the quality of the laser crystals.

In accordance with the present invention, an acoustic wave is generated to intersect the laser electromagnetic feedback energy in the laser optical cavity. The acoustic wave is preferably generated in an acoustic cell, and the cell is inserted in the laser feedback cavity between the laser medium and a detached external reflective mirror. The acoustic wave can also be generated within the laser medium, thereby eliminating the acoustic cell. The detached reflective mirror is made in a convex or spherical shape.

If the wave length $\Lambda$ of the acoustic wave is related to the width W of the laser beam such that $0 \ll W/\Lambda \leq 1$, and if the laser beam is propagated through the cell such that the center portion of the beam is centered on the anti-node of the acoustic wave, various light rays will be refracted by the acoustic wave and form a series of linear focal points in space beyond the external reflective mirror. The refraction of the light rays will occur symmetrically about the maximum point of the acoustic pressure wave.

As the amplitude of the acoustic wave increases or decreases with time, the focal points of various symmetrically spaced pairs of light rays will move closer to or farther from the laser medium. Each time a symmetrical light ray strikes the convex mirror at exactly 90°, it is reflected back through the laser feedback cavity, and that portion of the laser medium through which it passes will amplify the light ray, causing the small portion of the laser medium to lase.

In accordance with the invention, various geometrical portions of the laser medium can be caused to lase consecutively or simultaneously, and the output energy pulse from the laser will be varied accordingly.

By further varying the shape of the laser medium itself, numerous other output energy variations are possible.

BRIEF DESCRIPTION OF THE DRAWINGS

FIG. 1 is a schematic drawing of the laser pulse shaping system using sonic optic techniques; and FIG. 2 shows in cross section the geometric shape of various laser media together with the pulse shape produced thereby.

DESCRIPTION OF THE PREFERRED EMBODIMENT

Referring specifically to FIG. 1, a laser medium 10 such as a ruby crystal is inserted in a Fabry-Perot optical feedback cavity comprising a flat reflector or mirror 12 and a convex reflector or mirror 14. Pumping radiation as required from a source such as a flash lamp is supplied to energize the laser medium 10 as illustrated by arrows.

An ultrasonic-acoustic wave is generated in the laser feedback cavity to intersect the feedback radiation of the laser. The preferred manner of generating the acoustic wave is by means of an ultrasonic cell 16 which may be a liquid or solid cell, although the acoustic wave may be generated in the laser medium itself. A transducer 18 is attached to one end of the cell 16, and the transducer is actuated by a source of alternating voltage such as shown by oscillator 20, actuation of the transducer generating an acoustic wave within the cell of the same frequency as the oscillator voltage. As is well known in the art, the end of the cell 16 opposite the transducer may be terminated by an absorbing medium to prevent reflections of the acoustic wave thereby producing a traveling wave in the cell 16, or the cell may remain unterminated to allow reflections of the wave, thereby producing a standing wave.

Assuming a standing wave is generated in cell 16, FIG. 1 shows at line 21 the pressure gradient in the cell as a result of the standing wave. The higher pressure is shown when line 21 is to the right, and a lower gradient is shown when the line 21 is to the left. The center of the laser beam intersects the region of highest pressure. The portion of the acoustic wave which is intersected by the laser beam will vary in sinusoidal fashion and will alternately cause an increase and a decrease in the density of the medium of the cell through which the laser beam is propagated.

It is well known that an optical beam is refracted or bent when it traverses a medium of different density. When a ray of optical radiation from the laser 10, shown as dotted lines 22 traverses the ultrasonic cell, it is bent toward the region of higher density. Each ray 22 traverses a curved path through the cell, and exits the cell at a different angle than it entered the cell. Briefly, a light ray propagating normal to an acoustic field of length L and wavelength $\Lambda$ will exit the cell at an angle $\theta$ given by $$\sin \theta \simeq \frac{2\pi \Delta \eta L}{\Lambda}$$

where $\Delta \eta$ is the maximum change in the refracted index of the acoustic medium generated by the acoustic pressure wave having a peak pressure $P_0$. In a liquid, the relationship between $\Delta \eta$ and $P_0$ is given by $$\Delta \eta = \frac{(\eta^2-1)(\eta^2+2)}{6\eta} P_0$$

For a detailed explanation of the bending of light waves, reference may be made to A. J. De Maria and G. E. Danielson, Jr. "Internal Laser Modulation by Acoustic Lens-Like Effects," IEEE Journal of Quantum Electronics QE-2, 157-164 (1966); and A. J. De Maria, R. Gagosz, and G. Barnard, "Ultrasonic-Refractive Shutters for Optical Masers Oscillators," Journal of Applied Physics, 34, 453-456, 1963.

If the acoustic cell 16 has a length L which is smaller than the optical focal distance within the acoustic medium in the cell, and if the width W of the laser beam is related to the acoustic wave length $\Lambda$ of the acoustic wave by $0 << W/\Lambda \leqslant 1$, and if the center portion of the laser beam is centered on an anti-node of the acoustic wave, the light rays in the laser beam will be deflected different amounts symmetrically placed about the point of maximum pressure, and pairs of light rays will converge or cross each other at various distances along the axis of beam propagation (Y axis) as illustrated in FIG. 1.

As the amplitude of the acoustic wave increases or decreases with time, the point of focus of the various rays in the laser beam will move toward or away from the acoustic cell.

During the rarefaction portion of the acoustic cycle, i.e. when the laser beam intercepts the portion of the acoustic wave where the pressure is lowest, the light rays leaving the acoustic cell diverge. This occurs during alernate half cycles of the acoustic wave whether it is a standing wave or traveling wave.

If the convex reflector 14 is positioned at a point relative to the cell 16 where the fluorescence of each portion of the laser medium is focused coincidentally within the center of curvature of the convex reflector at the same time during the acoustic wave cycle, positive feedback will be initiated for the portion of the laser beam which is so focused. The occurrence of positive feedback results in laser action for the portion of the laser medium in which the feedback occurs.

The positive feedback is initiated when a light ray is refracted by the acoustic medium in cell 16 such that the ray would pass through the center of curvature of convex reflector 14 if the ray could pass through the reflector. When this condition occurs the ray will strike the reflector 14 exactly normal to its surface, and will be reflected back along the same path through the cell 16 and the laser medium 10 to intersect flat mirror 12, where the ray is again reflected. The portion of the laser medium 10 through which this ray passes will lase. Every other ray which strikes reflector 14 at an angle which is not exactly normal to its surface, i.e. those rays which would not, if extended, pass through the center of curvature of reflector 14, will not be reflected back through their initial path, and will not produce lasing action.

For example, the time T taken for a sinusoidal refractive index to change from a peak value $\Delta \eta p$ to a value $\Delta \eta$ is given by $$T = \frac{(\Delta \eta p - \Delta \eta)\Lambda}{2\Delta \eta \rho v}$$

where $v$ is the velocity of the acoustic wave producing the variation in the refractive index. For $\Delta \eta p = 10^{-4}$, $\Delta \eta = 5 \times 10^{-5}$, $\Lambda = 1$ cm. and $v \simeq 10^5$ cm./sec., the time is $2.5 \times 10^{-6}$ sec. If the length L of the cell is 10 cm., and the acoustic medium is a rod of diameter $\frac{2}{3}\Lambda$, the center of the reflector 14 should be placed at approximately 80 cm. from the cell 16. At the instant of time that $\Delta \eta = 10^{-4}$, the outer most perimeter of the laser rod will experience positive optical feedback. As time progresses, $\Delta \eta$ decreases, and the portion of the laser rod experiencing feedback moves toward the center of the rod, symmetrically about the center of the laser. Eventually only the center of the rod is lasing, and then the lasing moves outward again.

If a convex mirror 14 is used, the lasing portions of the laser rod will be lines moving from the top and bottom of the laser toward the center and back again. If reflector 14 is spherical, the lasing will be ring-like about the center of the laser rod, again moving toward the center and back again.

It is apparent that by using various cross-sectional shapes of laser media in conjunction with either sinusoidal or focused acoustic waves, various pulse shapes of coherent radiation may be obtained. For example, FIG. 2A shows a cross section of a circular laser rod 30, and the output pulse shape when the laser is actuated by a sinusoidal acustic wave with a convex reflector. Initially only the outer portions 32 of the laser rod are lasing, producing a small output, and as the lasing moves toward the center a greater portion of the rod will lase, increasing the output intensity. As the lasing proceeds outward again, the output intensity decreases.

FIG. 2B shows a square laser rod, where the intensity remains constant during the time the lasing takes place and produces a square wave. FIGS. 2C and 2D show the effect of rectangular laser rods on the pulse shape, the square wave outputs being varied in amplitude and duration.

FIG. 2E shows a triangular wave produced by a diamond-shaped laser rod, the output being low as the extremities of the rod which have a small cross sectional area are lasing, and increasing in intensity as the lasing portion moves to the center of the rod.

FIG. 2F shows the lasing pattern of an irregular shaped laser rod.

It is apparent that other shapes of laser rods may be used to generate other irregularly shaped outputs.

One use of this invention is the testing of laser rods, any irregularities or defects in the rod being apparent in the output wave shape as each incremental part of the rod lases consecutively.

Although the invention has been shown and described with respect to a preferred embodiment, it is understood that numerous changes may be made without departing from the scope of the invention, which is to be limited and defined only by the following claims.

We claim:
1. A laser pulse shaping apparatus comprising
   a laser medium,
   first and second external reflectors positioned at opposite ends of said laser medium to form an optical feedback cavity therebetween, one of said reflectors being a convex reflector having a center of curvature and being spaced from said laser medium, and means for causing selected portions of said laser radiation to have an apparent focus at the center of curvature of said convex reflector, said selected radiation portions being reflected from said convex reflector back through said laser medium to thereby produce lasing of selected portions of said laser medium.

2. A laser pulse shaping apparatus as in claim 1 in which said focusing means includes an acoustic cell positioned between said laser medium and said spaced reflector, and means to generate an acoustic wave in said cell, said acoustic wave intercepting said laser radiation.

3. A laser pulse shaping apparatus as in claim 2 in which said acoustic cell has a length in the direction of propagation of said laser radiation which is smaller than the optical focal distance within the acoustic medium of said cell.

4. A laser pulse shaping apparatus as in claim 2 in which said acoustic wave is a standing wave.

5. A laser pulse shaping apparatus as in claim 2 in which said spaced reflector is spherical.

6. A laser pulse shaping apparatus as in claim 2 and including means for varying the amplitude of said acoustic wave to cause each portion of said laser medium to lase consecutively.

7. A laser pulse shaping apparatus comprising
a laser medium,
first and second reflectors positioned at opposite ends of said laser medium to form an optical feedback cavity therebetween, one of said reflectors being convex and spaced from said laser medium,
an acoustic cell positioned between said laser medium and said spaced reflector to intercept the laser feedback radiation, and means to generate a time varying acoustic wave in said cell having a wavelength approximately equal to or larger than the width of said laser radiation, said acoustic wave intersecting said laser feedback radiation so that said laser radiation passes through said acoustic wave centered about an antinode of said acoustic wave, said acoustic wave focusing at least a portion of said laser radiation toward the center of curvature of said convex reflector during at least a portion of said acoustic wave cycle, said focused portion being reflected from said convex reflector back through said laser medium to produce lasing of selected portions of said laser medium.

8. A laser pulse shaping apparatus as in claim 2 in which said acoustic wave has a wavelength approximately equal to or slightly larger than the width of said laser radiation, the laser radiation intercepting said acoustic wave at a point substantially centered about an antinode of said acoustic wave.

References Cited

UNITED STATES PATENTS

| | | | |
|---|---|---|---|
| 3,274,512 | 9/1966 | Okaya | 331—94.5 |
| 3,297,876 | 1/1967 | De Maria. | |

RONALD L. WIBERT, Primary Examiner

P. K. GODWIN, Jr., Assistant Examiner

U.S. Cl. X.R.

332—7.51; 350—160